UNITED STATES PATENT OFFICE.

HILLHOUSE BUEL, OF SEATTLE, WASHINGTON.

PROCESS OF TREATING MILK.

1,327,308.   Specification of Letters Patent.   Patented Jan. 6, 1920.

No Drawing.   Application filed April 3, 1916.   Serial No. 88,482.

*To all whom it may concern:*

Be it known that I, HILLHOUSE BUEL, a citizen of the United States, and resident of the city of Seattle, county of King, State of Washington, have invented certain new and useful Improvements in Processes of Treating Milk, of which the following is a specification.

My invention relates to processes of treating milk, to free it of objectionable qualities and then to impart thereto desirable qualities. Briefly stated the process consists first in what may be called a pasteurization step, and then a following step by which desirable qualities and properties are imparted to the milk.

The object of my invention is to make of milk a food product, which may always be depended upon as being thoroughly safe and free from disease germs, and one possessing certain standard qualities of reliably constant character, capable of variation at will to suit desired or necessary requirements, and also to impart to the milk certain conditions and qualities, which make it more stable and resistant to deterioration and objectionable changes, and also to impart thereto desirable qualities of flavor, digestibility and the like.

This process involves two steps, unlike in character and purpose, but both necessary to produce the desired result, and following each other in proper sequence.

The first step is the destroying of the objectionable germs or bacteria, etc., and the second the implanting therein of bacteria of beneficial character, adapted to act thereon to produce therein the desired qualities and results.

The bacteriological purification of milk by pasteurization and like processes, is known to produce a product which is substantially free from germs of disease, ferments, etc., but one which still contains putrefying, deteriorating and objectionable germs, and which is in a favorable condition for the development of these and other objectionable bacteria. It has also lost much in flavor, palatability, and digestibility.

I have discovered that milk which has been treated by a pasteurization process is very susceptible to the development of certain classes of germs and ferments, as for instance sporating bacteria, colon bacillus, butyric bacillus, and the peptonizers.

Normal milk contains both injurious and beneficial bacteria, and these have more or less of a restraining or counteracting influence upon each other. Pasteurization and analogous processes, have been found to kill certain beneficial bacteria more effectively than they do certain of the injurious bacteria.

I have discovered that milk, after being subjected to a heat treatment, at such temperatures and for such periods of time as produce results short of absolute sterilization, will, when inoculated by implantation therein, with true, selected, viable cultures of the lactic acid group, have the properties of activating the preserving elements of such milk, of substantially destroying, retarding or inhibiting growth or development of most pathogenic, putrefactive, disease producing and other objectionable germs.

I have also discovered that such inoculative treatment materially modifies and controls the palatability, digestibility and flavor of the milk. Also that by proper choice of the type of bacilli used for such inoculation, different results in palatability, flavor, digestibility, and safety producing qualities may be secured, and that these different results may be predetermined.

The type of bacteria to be employed for implantation in the pasteurized milk, is that belonging to what is known as the lactic acid group. Different members of this group produce different results. By experiment and observation, I determine the results produced by different members of this group, produce and cultivate pure cultures thereof, and then employ for implantation such individual types as are best adapted to produce the desired results.

Such treated milk acquires a flavor and palatability, which is pleasant, a digestibility which is desirable and beneficial, and keeping qualities far superior to milk which is simply pasteurized. By such treatment milk is made safer for consumption, particularly as food for infants, and it may also be modified to suit the requirements of different stomachs. By this process of treatment of milk, is met and overcome the objections of physicians to the use as food, particularly for infants, of milk treated by pasteurization and like processes, and of raw and certified milk, and particularly where the source of supply is far removed from the point of consumption.

The character of the inoculation used in the number of bacteria implanted in the milk per unit of volume, may vary. What I have found to be a satisfactory bacterial content in the milk after inoculation, may range from 500 to 10,000 bacteria per c. c. A low bacterial count may be undesirable, for the reason that it would favor the too great development of the pathogenic or putrefactive bacteria, including those of the colon bacillus, butyric bacillus, the sporating bacteria, and the peptonizing group, while a higher strength of inoculation might, under ordinary temperatures of keeping the milk, produce a greater per cent. of acidity, accelerating to an undesirable extent the souring of the milk for normal consumption.

What I claim as my invention is:

1. The process of treating lacteal fluid consisting in giving it treatment to destroy the germs therein, implanting a viable culture of the lactic acid group therein to produce a bacterial content to the desired count per c. c. and sufficient to inhibit the growth of undesirable bacteria without affecting its sweet quality, and thereupon placing the fluid under conditions to inhibit further bacterial growth or fermentation.

2. The process of treating lacteal fluid consisting in giving it treatment to destroy the germs therein, implanting a viable culture of the lactic acid group therein to produce a bacterial content to the desired count per c. c. and sufficient to restore to such fluid its qualities of flavor and digestibility and to inhibit the growth of undesirable bacteria without affecting its sweet quality, and thereupon placing the fluid under conditions to inhibit further bacterial growth or fermentation.

3. The process of treating lacteal fluid consisting in giving it treatment to destroy the germs therein and thereupon to place it in condition favorable to the development of bacteria to be implanted therein, implanting a viable culture of the lactic acid group therein and developing the same to produce a bacterial content to the desired count per c. c. and sufficient to restore to such fluid its qualities of flavor and digestibility and to inhibit the growth of undesirable bacteria without affecting its sweet quality, and thereupon placing the fluid under conditions to inhibit further bacterial growth or fermentation.

4. In the process of preparing milk products for consumption, the process comprising adding a viable culture of the lactic acid group of bacteria to a fluid milk product which is in a substantially sterile condition, to produce a bacterial content to the desired count per c. c. and sufficient to inhibit the growth of undesirable bacteria without affecting its sweet quality and sufficient to restore to such fluid its qualities of flavor and digestibility, and thereupon maintaining said product under the conditions usually obtained in the milk trade for sweet milk.

Signed at Seattle, Washington, this 27th day of March, 1916.

HILLHOUSE BUEL.